US008651562B2

(12) United States Patent
Zörnack et al.

(10) Patent No.: US 8,651,562 B2
(45) Date of Patent: Feb. 18, 2014

(54) B-PILLAR REINFORCEMENT OF A MOTOR VEHICLE

(71) Applicants: Markus Zörnack, Dortmund (DE); Rolf Peter Röttger, Mühlheim (DE); Lothar Patberg, Moers (DE)

(72) Inventors: Markus Zörnack, Dortmund (DE); Rolf Peter Röttger, Mühlheim (DE); Lothar Patberg, Moers (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 13/741,061

(22) Filed: Jan. 14, 2013

(65) Prior Publication Data

US 2013/0140851 A1   Jun. 6, 2013

Related U.S. Application Data

(63) Continuation of application No. PCT/EP2011/061512, filed on Jul. 7, 2011.

(30) Foreign Application Priority Data

Jul. 16, 2010  (DE) .......................... 10 2010 036 450

(51) Int. Cl.
B62D 25/04   (2006.01)

(52) U.S. Cl.
USPC .................................. 296/193.06; 296/187.12

(58) Field of Classification Search
USPC ........................ 296/193.06, 187.12, 203.03
See application file for complete search history.

(56) References Cited

U.S. PATENT DOCUMENTS

| 6,474,726 B1 | 11/2002 | Hanakawa et al. | |
|---|---|---|---|
| 7,237,832 B2 * | 7/2007 | Saeki .................. | 296/193.06 |
| 7,357,448 B2 | 4/2008 | Chen et al. | |
| 8,419,113 B2 * | 4/2013 | Kunishi et al. ........... | 296/193.06 |
| 2008/0315628 A1 | 12/2008 | Obayashi | |

FOREIGN PATENT DOCUMENTS

| DE | 102005017982 A1 | 11/2006 |
|---|---|---|
| DE | 102006045494 A1 | 4/2008 |
| EP | 1454819 A2 | 9/2004 |
| EP | 1 927 534 A1 | 6/2008 |

* cited by examiner

*Primary Examiner* — Joseph Pape

(74) *Attorney, Agent, or Firm* — Reinhart Boerner Van Deuren P.C.

(57) ABSTRACT

The invention relates to a B-pillar reinforcement of a motor vehicle having an upper region for joining the B-pillar reinforcement to the roof region of the motor vehicle and a lower region for joining the B-pillar reinforcement to a floor support of the motor vehicle, which B-pillar reinforcement comprises at least one hollow profile made of metal, in particular steel, and the hollow profile forms the upper and lower regions of the B-pillar reinforcement. The object of providing an improved B-pillar reinforcement which, on the one hand, is optimised in respect of a load-appropriate configuration with a minimum weight, allows a very good integration of additional components of the B-pillar, is achieved in that the hollow profile has at least to some extent a substantially trapezoidal cross-sectional surface in one of the regions and has an at least partly U-shaped cross-sectional surface in the other region.

12 Claims, 3 Drawing Sheets

B-PILLAR REINFORCEMENT OF A MOTOR VEHICLE

CROSS-REFERENCE TO RELATED PATENT APPLICATIONS

This patent application is a continuation of PCT/EP2011/061512, filed Jul. 7, 2011, which claims priority to German Application No. 102010036450.9, filed Jul. 16, 2010, the entire teachings and disclosure of which are incorporated herein by reference thereto.

BACKGROUND OF THE INVENTION

The invention relates to a B-pillar reinforcement of a motor vehicle having an upper region for joining the B-pillar reinforcement to the roof region of the motor vehicle and a lower region for joining the B-pillar reinforcement to a floor support of the motor vehicle, which B-pillar reinforcement comprises at least one hollow profile made of metal, in particular steel, and the hollow profile forms the upper and lower regions of the B-pillar reinforcement.

Motor vehicles have between the front and rear door cutouts a central pillar which is usually called a B-pillar. The function of the B-pillar is to support the roof region of the motor vehicle on the floor support and, if appropriate, to provide a support for the front and rear side doors. At the same time, the B-pillar is also a visible part of the skin of the motor vehicle. In addition, in the event of a side impact, the behaviour of the motor vehicle is also greatly influenced by the B-pillar. Therefore, B-pillars usually consist of a B-pillar reinforcement which is provided inside the B-pillar, and of at least one skin sheet which is the directly visible part of the B-pillar. In order to respond to the different load regions of the B-pillar while providing a minimum weight, it is known from US patent application US 2008/0315628 A1 to produce the B-pillar reinforcement in the upper, central and lower regions from steel of different strengths. This B-pillar reinforcement has a cross-sectional surface which is substantially trapezoidal over its length. However, in the case of this B-pillar reinforcement, there is still the potential for improvement in respect of weight and cost for the production of said B-pillar reinforcement and for the integration of further components of the B-pillar.

SUMMARY OF THE INVENTION

Starting from this above referenced prior art, the object of the present invention is to provide an improved B-pillar reinforcement which, on the one hand, is optimised in respect of a load-appropriate configuration with a minimum weight and, on the other hand, allows a very effective integration of additional components of the B-pillar.

The mentioned object is achieved for a generic B-pillar reinforcement of a motor vehicle in that the hollow profile has at least to some extent a substantially trapezoidal cross-sectional surface in one of the regions and has an at least partly U-shaped cross-sectional surface in the other region.

Changing the shape of the cross-sectional surface of the B-pillar reinforcement improves the flexural strength thereof, so that smaller sheet thicknesses can be used. Furthermore, both regions and thereby the B-pillar reinforcement have a deformation behaviour which differs in the regions and can be used for a load-appropriate configuration of the B-pillar reinforcement. This provides further potential to save costs and reduce weight.

According to a first configuration of the B-pillar reinforcement of the invention, changing the cross-sectional surface from a substantially trapezoidal shape to a U-shape can be achieved in a particularly simple manner in that at least the side of the hollow profile facing the passenger compartment of the motor vehicle has a cross-sectional shape which varies in the longitudinal direction of the hollow profile. The varying cross-sectional shape of the side facing the passenger compartment can be produced, for example, by impressing the facing side towards the outside of the B-pillar reinforcement.

In the region of the substantially trapezoidal cross-sectional surface, the shorter of the parallel sides of the trapezoidal cross-sectional surface is preferably arranged on the side of the hollow profile remote from the passenger compartment. Consequently, in the event of a side collision, the deformation of the regions of the B-pillar reinforcement, having a trapezoidal cross-sectional surface, towards the passenger compartment is converted into a tensile stress in the longer of the parallel sides of the trapezoidal cross-sectional surface, and thus the B-pillar reinforcement is configured to be particularly rigid in respect of the B-pillar being pushed into the passenger compartment.

A slightly less bending-resistant configuration of the B-pillar reinforcement is easily achieved in that the sides of the U-shaped cross-sectional surface are arranged such that they are open towards the passenger compartment. These regions of the B-pillar reinforcement can be provided, for example, where a specific deformation behaviour is required in order to absorb as much impact energy as possible.

According to a further embodiment, the B-pillar reinforcement according to the invention can be advantageously configured in that the hollow profile is produced from a closed profile which has at least to some extent a trapezoidal cross-sectional surface and is configured at least to some extent as a double-walled U-profile by at least one impression in a region of the closed profile. The region configured as a double-walled U-profile has a particularly high flexural strength in respect of deformation due to the double wall, so that here as well, the wall thickness of the hollow profile can be adapted to the required flexing loads and can be reduced. As a result of producing the hollow profile of the B-pillar reinforcement from a closed profile, it is also easily possible to produce a flangeless hollow profile as a B-pillar reinforcement if a flangeless closed profile is formed.

According to a further embodiment of the B-pillar reinforcement according to the invention, the closed profile is produced from a tubular and optionally longitudinally welded profile, in particular from a "modular tube". On the one hand, the production costs of the B-pillar reinforcement are reduced in that the joining step of the tubular profile can be carried out in the tubular state and thus can be carried out more easily. During the use of "modular tubes", this also applies when different material thicknesses and/or material qualities are to be used in a closed profile. Longitudinal welding provides a particularly cost-effective production of tubular profiles.

According to a further embodiment of the B-pillar reinforcement of the invention, if the hollow profile is formed by an at least partly open U-shaped profile with a closing plate, the closing plate having at least to some extent a planar cross-sectional shape in one region and having at least to some extent a U-shaped cross-sectional shape, open towards the passenger compartment, in the other region, a flanged hollow profile can be produced in a particularly simple manner for the B-pillar reinforcement according to the invention. The flanges can be used, for example, to join further components of the B-pillar to the B-pillar reinforcement. Although the closing plate and the U-shaped profile have to be joined by a joining method step which usually entails two welds, different cross-sectional surfaces can be produced in a particularly simple manner in the B-pillar reinforcement by means of the closing plate and the forming thereof. The U-shaped profile of this embodiment of the B-pillar reinforcement according to the invention can be provided, for example, by deep drawing a blank.

The U-shaped profile is preferably a top-hat profile and/or the closing plate is preferably configured as a top-hat profile in the region of the U-shaped cross-sectional shape. Top-hat profiles have the advantage that they can already provide flanged regions which, on the one hand, allow further components but also the closing plate to be easily joined. On the other hand, the flanged regions also serve to increase the flexural strength of the top-hat profile.

The construction of the hollow profile of the B-pillar reinforcement according to the invention from a closing plate and an at least partly U-shaped profile can be adapted particularly easily to different, specific load situations, in that the U-shaped profile and/or the closing plate are produced from two correspondingly formed individual blanks which are configured as tailored blanks. Tailored blanks are metal sheets which have different material thicknesses and/or material qualities and can be used as semi-finished products for the production of U-shaped profiles or closing plates.

According to a next configuration of the B-pillar reinforcement according to the invention, the upper region of the hollow profile of the B-pillar reinforcement has the at least partly trapezoidal cross-sectional surface and the lower region of the hollow profile has the at least partly U-shaped cross-sectional surface. The part of the hollow profile which has an at least partly trapezoidal cross-sectional surface is characterised by an increased flexural strength which is usually required in the roof frame region. On the other hand, the at least partly U-shaped cross-sectional surface in the lower region of the hollow profile of the B-pillar reinforcement ensures an improved deformation behaviour in the lower B-pillar region, because the lower B-pillar region can absorb impact energy due to the specifically adjusted deformation behaviour and can convert it into deformation energy.

For the same purpose, it is advantageous for the B-pillar reinforcement to extend in a curved manner in the longitudinal direction and to have a wider cross section in the lower region than in the upper region. The curved course of the B-pillar reinforcement can help prevent the B-pillar or the B-pillar reinforcement intruding into the passenger compartment.

Furthermore, the B-pillar reinforcement according to the invention can advantageously be configured in that connections for seat belt deflectors are integrated in the hollow profile in the upper region of the B-pillar reinforcement and/or seat belt retractors are integrated in the lower region of the B-pillar reinforcement. Particularly in combination with the arrangement of the trapezoidal cross-sectional surface in the upper region of the hollow profile, the use of seat belt deflectors can be provided simply by a hole in the passenger compartment-side of the closing plate or in the side of the hollow profile. Furthermore, the seat belt retractor can be arranged or integrated in a space-saving manner in the U-shaped cross section, open in the direction of the passenger compartment, of the lower region of the hollow profile.

Finally, reinforcements can preferably be provided in the region of the connection of seat belt deflectors and/or seat belt retractors. In the case of seat belt deflectors, for example, these reinforcements can be configured as a threaded sleeve or as an additional reinforcing patch. Reinforcing patches are metal sheets which are joined to the hollow profile in a material-uniting manner, for example by welding, soldering and/or adhesive bonding, to reinforce specific areas of the hollow profile in order to selectively increase the wall thickness in these regions of the hollow profile.

BRIEF DESCRIPTION OF THE DRAWINGS

In the following, the invention will be described in more detail with reference to drawings of embodiments.

DETAILED DESCRIPTION OF THE INVENTION

Figure 1:
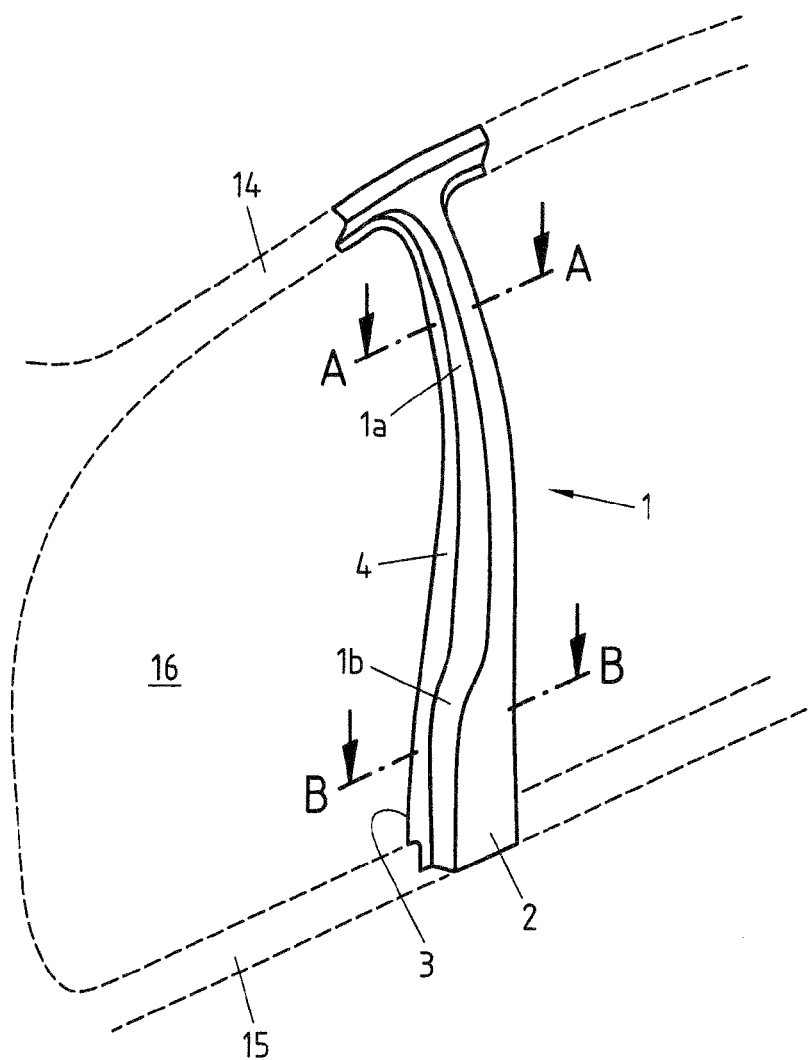
FIG. 1 is a perspective view of a B-pillar reinforcement according to a first embodiment of the present invention, FIG. 2a), b) are schematic sectional views along lines A-A and B-B of the first embodiment of the B-pillar reinforcement according to the invention, FIG. 3a), b) are schematic sectional views along lines A-A and B-B of a second embodiment of a B-pillar reinforcement according to the invention, FIG. 4a), b) are schematic sectional views along lines A-A and B-B of the embodiment from FIG. 2, with additionally integrated components, FIG. 5a), b) show a third embodiment of the B-pillar reinforcement according to the invention along lines A-A and B-B.

FIG. 1 is a perspective view of a B-pillar reinforcement 1 according to the invention having an upper region 1a and a lower region 1b. The first embodiment of the B-pillar reinforcement 1 according to the invention shows a curved path in the longitudinal direction, the cross section of the B-pillar reinforcement along line A-A being smaller than along line B-B. Arranged above the line A-A is a roof support 14 of a motor vehicle, to which the B-pillar reinforcement 1 is joined. The lower region 1b of the B-pillar reinforcement is joined to a floor support 15, which is likewise only shown schematically. FIG. 1 also shows the passenger compartment 16 which is delimited by the roof support 14, the floor support 15 and the B-pillar reinforcement on each side of the vehicle body.

The embodiment of FIG. 1 is constructed from an open U-shaped top-hat profile 2 and a closing plate 3. As already stated, the use of a closing plate 3 together with a U-shaped top-hat profile 2 allows a particularly simple production of the B-pillar reinforcement 1 according to the invention, with the provision of flanges 4 by the closing plate 3 and the U-shaped top-hat profile 2. Both the closing plate 3 and the U-shaped, open top-hat profile 2 can provide the necessary shapes by simple forming processes.

Figure 2A:
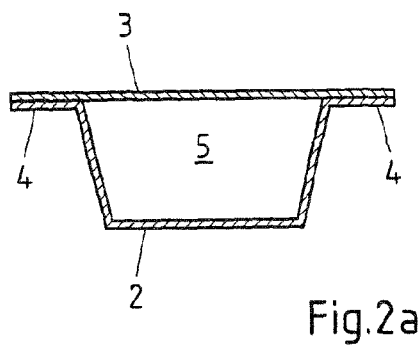
Figure 2B:
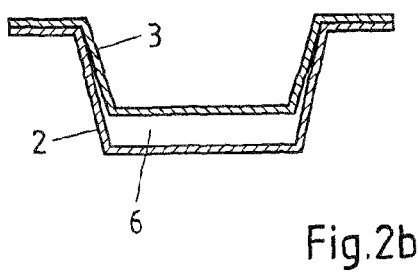

FIG. 2 is a schematic sectional view of the embodiment from FIG. 1 along line A-A in FIG. 2a) and along line B-B in FIG. 2b). It can be seen that along line A-A, a substantially trapezoidal cross-sectional surface 5 is formed by the closing plate 3 and the U-shaped, open top-hat profile 2 in the upper region 1a of the B-pillar reinforcement 1. The B-pillar reinforcement 1 is usually devised such that in the region of the trapezoidal cross-sectional surface, here in the upper region of the B-pillar reinforcement 1, the shorter of the parallel side faces of the cross-sectional surface 5 is directed away from the passenger compartment 16.

In the region of the trapezoidal cross-sectional surface 5, a deformation of the B-pillar reinforcement 1 in the direction of the passenger compartment then produces a tensile load on the closing plate 3 which is joined, preferably welded, in a material-uniting manner with the U-shaped profile 3 in the region of the flanges 4. Therefore, the closing plate 3 acts as a tension plate, so that the upper region 1a of the B-pillar reinforcement 1 is particularly rigid in respect of a deformation towards the passenger compartment 16.

FIG. 2b) shows the lower region 1b in the B-pillar reinforcement from FIG. 1 along line B-B. Clearly visible is the U-shaped cross-sectional surface 6 which is produced by reforming the closing plate 3 from a planar sheet in the upper region of the B-pillar reinforcement into a top-hat profile in the lower region 1b of the B-pillar reinforcement. This region is configured to be not as bending resistant as the upper region of the B-pillar reinforcement 1 and therefore, as a result of deformation, can absorb impact energy of a side collision.

Figure 3A:
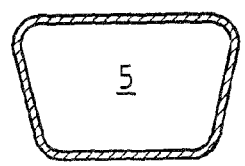
Figure 3B:
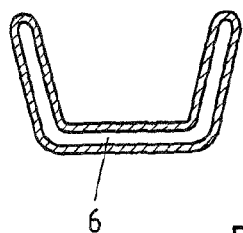

FIG. 3 shows schematic sectional views of a flangeless second embodiment of the B-pillar reinforcement 1 according to the invention, along line A-A in FIG. 3a) and along line B-B in FIG. 3b). The starting point for this embodiment of the B-pillar reinforcement 1 according to the invention is a closed, flangeless hollow profile with a region which has at least to some extent a trapezoidal cross-sectional surface 5, FIG. 3a). By pressing in a portion of the closed hollow profile, a double-walled, U-shaped profile is produced which has a U-shaped cross-sectional surface 6 in the lower region and a trapezoidal cross-sectional surface 5 in the upper region. The present embodiment is without flanges and is thus optimised in terms of weight. The hollow profile can be produced, for example, by U-O reforming process. Furthermore, as a result of using "modular tubes" for the production of this embodiment, it is possible to also react to specific loads in the installed state, for example in which the "modular tube" has different cross sections.

Figure 4A:
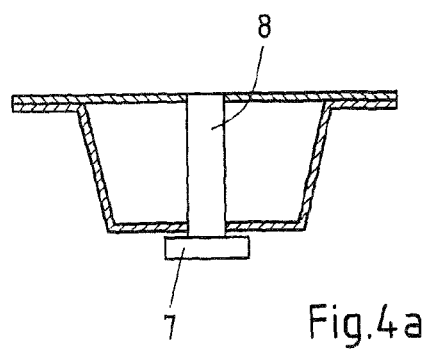

FIG. 4a) and b) show the embodiment of FIG. 2. However, unlike FIG. 2, a connection 7 for a seat belt deflector in the form of a screw is shown. The connection is reinforced, for example, using a sleeve 8.

Figure 4B:
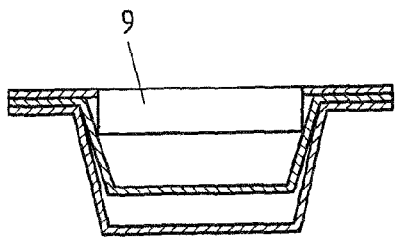

FIG. 4b) shows along sectional line B-B the arrangement of a seat belt retractor 9, integrated into the installation space, provided by the B-pillar reinforcement according to the invention in the lower region of the B-pillar reinforcement 1. As can be seen in FIGS. 4a) and 4b), the integration of connecting elements 7 for seat belt deflectors and the integration of seat belt retractors 9 is configured in a particularly simple manner in the B-pillar reinforcement 1 according to the invention.

Figure 5A:
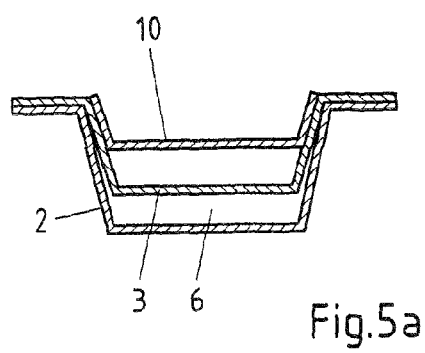
Figure 5B:
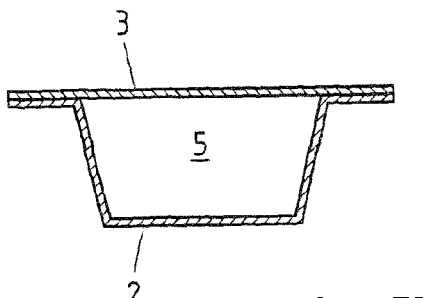

Finally, FIG. 5 shows schematic sectional views along lines A-A and B-B of a third embodiment of the B-pillar reinforcement according to the invention. Unlike in the previous embodiments, a particularly bending-resistant configuration of the upper region along line A-A is achieved by the reinforcement of the upper region, provided with a U-shaped cross-sectional surface 6, as a result of using an additional reinforcing profile 10. As shown in the sectional view along line B-B, a trapezoidal cross-sectional surface 5 is provided in the lower region of the B-pillar reinforcement to provide a flexural strength, adapted to the flexural strength of the upper region, in the lower region of the B-pillar reinforcement.

Figure 6:
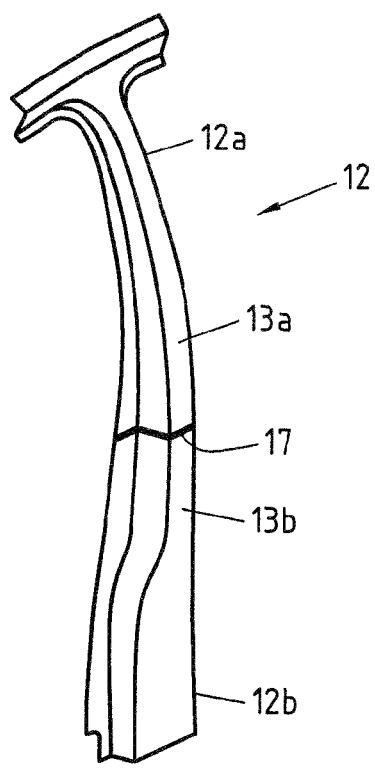
FIG. 6 is a perspective view of a fourth embodiment of the B-pillar reinforcement according to the invention.

FIG. 6 is a perspective view of a B-pillar reinforcement according to the invention. The B-pillar reinforcement 12 with an upper region 12a and a lower region 12b has been produced from a tailored blank, consisting of two different blanks 13a and 13b. The regions 13a and 13b can have different material thicknesses and/or qualities and are joined together by a weld 17, usually a laser weld. Tailored blanks are generally processed like one-piece sheets and can thus meet different requirements of the B-pillar reinforcement according to the invention. For example, it is conceivable to form the lower part 13b of the B-pillar reinforcement from a relatively soft deformable steel to improve the deformation behaviour. It is equally possible to form the region 13a of the B-pillar reinforcement 12 from high-strength steel. Varying the wall thicknesses of the regions 13a and 13b also makes it possible to optimise the deformation behaviour and the weight of the B-pillar reinforcement 12. The same also applies to the closing plate (not shown in FIG. 6) which can also be produced by forming a tailored blank. Of course, it is also conceivable to provide not only two-piece tailored blanks, but also multi-piece, for example, three-piece tailored blanks, in order to adapt the B-pillar reinforcement 12 more specifically to the loads when it is installed.

The invention claimed is:

1. B-pillar reinforcement of a motor vehicle comprising an upper region for joining the B-pillar reinforcement to a roof region of the motor vehicle and a lower region for joining the B-pillar reinforcement to a floor support of the motor vehicle, the B-pillar reinforcement comprises at least one hollow profile made of metal, and the hollow profile forms the upper and lower regions of the B-pillar reinforcement, wherein the hollow profile has a substantially trapezoidal cross-sectional surface in one of the upper and lower regions and has a partly U-shaped cross-sectional surface in the other region, wherein changing the cross-sectional surface from a substantially trapezoidal shape to a U-shape is achieved in that at least a side of the hollow profile facing the passenger compartment of the motor vehicle has a cross-sectional shape which varies in a longitudinal direction of the hollow profile.

2. B-pillar reinforcement according to claim 1, wherein in the region of the hollow profile having a trapezoidal cross-sectional surface, a shorter one of parallel sides of the trapezoidal cross-sectional surface is arranged on a side of the hollow profile remote from the passenger compartment.

3. B-pillar reinforcement according to claim 1, wherein in the region of the hollow profile having a U-shaped cross-sectional surface, the sides of the U-shaped cross-sectional surface are arranged such that they are open towards the passenger compartment.

4. B-pillar reinforcement according to claim 1, wherein the hollow profile is produced from a closed profile which has a trapezoidal cross-sectional surface and is configured as a double-walled U-profile by in a region of the closed profile.

5. B-pillar reinforcement according to claim 4, wherein the closed profile is produced from a tubular welded profile.

6. B-pillar reinforcement according to claim 1, wherein the hollow profile is formed by an at least partly open, U-shaped profile with a closing plate, the closing plate having at least to some extent a planar cross-sectional shape in one region and having at least to some extent a U-shaped cross-sectional shape, open towards the passenger compartment, in the other region.

7. B-pillar reinforcement according to claim 6, wherein the U-shaped profile or the closing plate is a top-hat profile and is configured in the region of the U-shaped cross-sectional shape.

8. B-pillar reinforcement according to claim 6, wherein the U-shaped profile with a closing plate is produced from two correspondingly formed individual blanks which are configured as tailored blanks.

9. B-pillar reinforcement according to claim 1, wherein the upper region of the hollow profile has the at least partly trapezoidal cross-sectional surface and the lower region of the hollow profile has the at least partly U-shaped cross-sectional surface.

10. B-pillar reinforcement according to claim 1, wherein the B-pillar reinforcement extends in a curved manner in the longitudinal direction and has a wider cross section in the lower region than in the upper region.

11. B-pillar reinforcement according to claim 1, wherein connections for seat belt deflectors are integrated in the upper region of the B-pillar reinforcement and/or seat belt retractors are integrated in the lower region of the B-pillar reinforcement.

12. B-pillar reinforcement according to claim 11, wherein reinforcements are provided in the region of the connection of seat belt deflectors and/or seat belt retractors.

* * * * *